United States Patent [19]
Toy

[11] Patent Number: 5,410,600
[45] Date of Patent: Apr. 25, 1995

[54] PRE-SCRAMBLE ENCODING METHOD AND APPARATUS FOR DIGITAL COMMUNICATION

[75] Inventor: James W. Toy, Melbourne, Fla.

[73] Assignee: Broadband Communications Products, Inc., Melbourne, Fla.

[21] Appl. No.: 795,190

[22] Filed: Nov. 18, 1991

[51] Int. Cl.[6] ............................................. H04L 9/00
[52] U.S. Cl. ........................................ 380/9; 380/49
[58] Field of Search ................... 341/93, 94; 375/25; 380/9, 25, 42, 49; 370/102, 107

[56] References Cited

U.S. PATENT DOCUMENTS

| | | | |
|---|---|---|---|
| 3,872,257 | 3/1975 | Bleickardt et al. | 370/102 |
| 4,352,129 | 9/1982 | Baldwin | 341/93 |
| 4,471,164 | 9/1984 | Henry | 380/30 |
| 4,568,915 | 2/1986 | Gutleber | 375/25 |
| 4,827,513 | 5/1989 | Austin | 380/42 |
| 4,975,952 | 12/1990 | Mabey | 380/49 |
| 5,144,304 | 9/1992 | McMahon et al. | 380/94 |

*Primary Examiner*—Salvatore Cangialosi
*Attorney, Agent, or Firm*—Charles E. Wands

[57] ABSTRACT

A prescramble encoding mechanism divides a data word into a plurality of sequences of data bits for transmission over a fiber optic communication link. Complementary versions of control bits and odd and even parity bits are interleaved between the bit parallel data and control signals, divides a parallel data word possible series of consecutive bits of the same logical state is less than a predetermined number related to the length of the data bit sequences and to placement of the complementary control bits and even and odd parity bits. The data frame is then scrambled prior to transmission over the fiber optic link. Depending on the exact nature of the scrambling and descrambling process, a single-bit link error may produce a plurality of bit errors in the descrambled frame. To increase the likelihood that the link error will be detected by the parity checks in the descrambled frame, a frame may be resequenced to separate adjacent bits prior to scrambling and resequenced back to the original sequence after descrambling. As a consequence, a single-bit link error which causes multiple descrambled bit errors will cause widely separated bit errors so that, for the most part, each error bit will be in a separate data bit sequence which is the subject of a separate parity bit calculation. At the receive end of the link, received signals are descrambled, resequenced back to their original order and then demultiplexed to respective outputs.

29 Claims, 9 Drawing Sheets

FIG. 1
DUAL-SIMPLEX HIPPI INTERCONNECT DIAGRAM

| SERIAL DATA | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| HIPPI DATA PLUS OVERHEAD | M1 | 0 | 8 | 16 | 24 | $\overline{M1}$ | 1 | 9 | 17 | 25 | P1 | PK | 10 | 18 | 26 |

| SERIAL DATA | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| HIPPI DATA PLUS OVERHEAD | 2 | $\overline{PK}$ | 11 | 19 | 27 | 3 | P2 | B | 20 | 28 | 4 | 12 | $\overline{B}$ | 21 | 29 |

| SERIAL DATA | 31 | 32 | 33 | 34 | 35 | 36 | 37 | 38 | 39 | 40 | 41 | 42 | 43 | 44 |
|---|---|---|---|---|---|---|---|---|---|---|---|---|---|---|
| HIPPI DATA PLUS OVERHEAD | 5 | 13 | P3 | M2 | 30 | 6 | 14 | 22 | $\overline{M2}$ | 31 | 7 | 15 | 23 | P4 |

ERROR TABLE

| ERROR PATTERN | BYTE IN ERROR 1 | 2 | 3 | 4 | PARITY BITS IN ERROR 1 | 2 | 3 | 4 |
|---|---|---|---|---|---|---|---|---|
| 1  | X | X |   |   |   |   |   |   |
| 2  | X | X | X |   |   |   |   |   |
| 3  |   | X | X | X |   |   |   |   |
| 4  |   |   | X | X | X |   |   |   |
| 5  |   |   |   | X | X |   |   |   |
| 6  |   | X |   |   |   |   |   |   |
| 7  | X | X | X |   |   |   |   |   |
| 8  |   | X | X | X |   |   |   |   |
| 9  | X |   | X | X |   |   |   |   |
| 10 | X |   |   | X |   |   |   |   |
| 11 |   | X |   |   | X |   |   |   |
| 12 |   | X | X |   |   |   |   |   |
| 13 |   |   | X | X |   |   |   |   |
| 14 | X |   | X | X |   |   |   |   |
| 15 | X |   |   | X |   |   |   |   |
| 16 | X |   |   |   |   | X |   |   |
| 17 |   |   |   |   |   | X |   |   |
| 18 |   | X | X |   |   |   |   |   |
| 19 | X |   | X | X |   |   |   |   |
| 20 | X | X |   | X |   |   |   |   |
| 21 | X | X |   |   |   |   |   |   |
| 22 |   |   | X |   |   |   |   |   |
| 23 |   |   | X | X |   | X |   |   |
| 24 | X |   | X | X |   |   |   |   |
| 25 | X | X |   | X |   |   |   |   |
| 26 | X | X |   |   |   |   | X |   |
| 27 |   | X |   |   |   |   | X |   |
| 28 |   |   |   | X |   |   |   |   |
| 29 | X |   | X | X |   |   |   |   |
| 30 | X | X |   | X |   |   |   |   |
| 31 | X | X | X |   |   |   |   |   |
| 32 |   | X | X |   |   |   |   |   |
| 33 |   |   |   | X |   |   | X |   |
| 34 | X |   |   | X |   |   |   |   |
| 35 | X | X |   | X |   |   |   |   |
| 36 | X | X | X |   |   |   |   |   |
| 37 |   | X | X |   |   |   | X |   |
| 38 |   |   | X |   |   |   | X |   |
| 39 | * |   |   |   |   |   |   |   |
| 40 | * | * |   | X |   |   |   |   |
| 41 | X | * | * |   |   |   |   |   |
| 42 |   | X | * | * |   |   |   |   |
| 43 |   |   | X | * |   |   |   |   |
| 44 | * |   |   |   |   |   | X |   |

FIG. 8

BYTE 1 = BITS 0-7
BYTE 2 = BITS 8-15
BYTE 3 = BITS 16-23
BYTE 4 = BITS 24-31

X = FIRST FRAME
* = SECOND FRAME

NOTE: ALL ERRORS ARE DETECTABLE SINCE THERE ARE NO CASES OF TWO ERRORS IN A SINGLE BYTE OR IN A BYTE AND ITS ASSOCIATED PARITY BIT.

PRE-SCRAMBLE ENCODING METHOD AND APPARATUS FOR DIGITAL COMMUNICATION

FIELD OF THE INVENTION

The present invention relates generally to data communications and, more specifically, to a pre-scramble encoding mechanism used in the course of transmitting data over a high speed communication link with improved efficiency and performance.

BACKGROUND OF THE INVENTION

Fiber optic communication lines are being used increasingly for data communications. This usage has raised several new system design issues, particularly relating to interfaces between electronic devices, such as logic devices, and optical transmitters and receivers. Communication interface devices which convert parallel data to a serial form for transmission over a high speed serial link and vice versa have certain design constraints because of the characteristics of fiber optic communication lines. Signals transmitted over optical fibers should have approximately a 50% balance between logical high and low states, and should keep a maximum number of consecutive bits in the same logic state as low as possible. These requirements have to do with facilitating optical reception of the signal, and clock recovery. Existing clock recovery technology can most easily extract a clock from a data stream over a fiber optic communication link if the maximum number of consecutive identical bits in the data stream is no higher than about 20 to 25 bits.

The American National Standards Institute (ANSI) X3T9.3 Committee has recently promulgated a new interface standard for digital devices, such as computers. The standard is called HIPPI, for HIgh Performance Parallel Interface. A HIPPI interface is defined as having a given number of parallel data lines, e.g., 32 data lines, parity lines, and various control lines. HIPPI interfaces conform to the ANSI X3T9.3 standard for differential emitter coupled logic (ECL) signals. Standard 100-pin connectors are used.

An interface device which is to be used between a HIPPI interface and a fiber optic communication line essentially converts the HIPPI signals to a serial form for transmission over the fiber optic line, and converts serial information received over the line back to HIPPI.

In the past, fiber optic communication lines primarily carried telephone conversations. Data streams representative of telephone conversations or other voice messages could generally be relied upon to be random enough that scrambling would produce a 50% balance and frequent transitions would be available. However, since more and more computer and digital data systems are using fiber optic lines for communication, this randomness can no longer be guaranteed. In some instances, particularly if the line is idle, long series of consecutive identical bits can occur. Thus, there is a need for an interface apparatus which facilitates fiber optic communication by providing a serial data stream having suitable balance and frequent data transitions, regardless of the characteristics of the input data.

Conventional systems have attempted to meet these balance and consecutive bit requirements by using encoding schemes such as 4B/5B and 8B/10B encoding. In some cases, NRZ to NRZI conversion is used. These techniques add 2 bits of overhead for each 8 data bits. Maintaining a given data bit rate thus involves a 25% overall bit rate increase. This increase may place a burden on the transmission medium and increase system cost. In addition, these encoding schemes are moderately complex to implement.

An alternative approach to meeting the 50% balance and consecutive bit requirements has involved randomizing data by scrambling. An input data stream is passed through a linear sequential circuit which sums a pseudorandom bit stream with the data to scramble the data. The data thus scrambled is transmitted, and descrambled by a similar process at its destination. Unfortunately, with some input data, this technique does not always establish a good 50% balance, and there remains a probability of $\frac{1}{2}^n$ that an n-bit period of no transitions can occur. Therefore, this technique does not guarantee frequent enough transitions for the clock recovery circuit.

A scrambling technique which attempts to provide a serial data stream having good transmission characteristics is described in the article "Guided Scrambling: A New Line Coding Technique for High Bit Rate Fiber Optic Transmission Systems" by Fair et al (IEEE Transactions on Communications, Vol. 39, No. 2, February 1991, pp. 289-297). The technique described in this article involves augmenting an input data stream prior to scrambling with a given scrambling polynomial in order to improve the balance and bit transition characteristics of the scrambled data stream. Augmentation is accomplished by inserting augmentation bits having different values, to produce a plurality of augmented bit streams. The bit stream having the best transmission characteristics is selected for transmission. This method is relatively complex and cumbersome, and also delays the data stream, since the augmentation process is guided by feedback based on the relative transmission characteristics of the augmented data streams produced.

SUMMARY OF THE INVENTION

In order to provide a fiber optic communication interface which provides an adequate signal balance and frequent transitions notwithstanding the data stream, and which is relatively simple and avoids a data stream delay, there is provided in accordance with the invention a pre-scramble encoding method and apparatus in which true and inverted versions of certain bits, called "dual bits" are inserted into the data stream. Overhead bits may be used in a way to make data frames of the data stream asymmetric and non-periodic. In addition, the data may be resequenced for insertion into the serial data such that error detection is enhanced when parity checking is used. The data stream, thus processed, is scrambled for transmission over a high speed serial link. At the other end of the link, the data stream is descrambled, the dual bits removed and the data resequenced back to its original sequence. The method may be used for various digital communication interfacing applications, such as interfacing a HIPPI terminal and a fiber optic communication line.

An apparatus according to the invention includes a multiplexer which receives a sequence of parallel data words along with overhead bits. The multiplexer interleaves true and inverted versions of the overhead bits, which are called dual bits, between the bit sequences, and also inserts even and odd parity bits calculated from the data bit sequences. These dual bits are arranged within the data to increase the number of transitions in the unscrambled data stream. These increased data transitions make the subsequent scrambling of the data conform to the balance and frequent transition requirements. In addition, the dual bits are placed at bit intervals which are relatively prime to the scrambler register length. Also, frame asymmetry is produced by use of multiplexed overhead bits and odd/even parity bit insertions. As a consequence, the likelihood is diminished that a repeating input pattern will synchronize with the scrambler circuit.

Also, the encoded serial data frame includes dual bits, such that the longest possible series of consecutive bits in an identical state, high or low, is less than a predetermined number. The longest series of identical bits is related to the length of the data bit sequences and to placement of the dual bits.

During the interleaving process, the data frame is resequenced before scrambling and transmission. Resequencing involves rearranging the bits of a frame in a predetermined manner, so that adjacent bits in the original frame are separated from each other. Resequencing guarantees that a single bit error over the link will be detected when byte parity is also transmitted. Scrambling involves passing the resequenced frame through a linear sequential circuit which sums a pseudorandom bit stream with the data. Scrambling, alone, is subject to a phenomenon in which a certain data pattern which happens to be in sync with the scrambler produces a repeating pattern out. Because of inserting dual bits, interleaving overhead resequenced bits and mixing odd and even parity bits, the pattern is less likely to be symmetric or periodic. Therefore, preventing synchronization between the scrambler and the unscrambled data, the scrambled data stream is more apt to conform to the balance and frequent transition requirements of fiber optic data transmission.

After transmission across the fiber optic link, the data frame is descrambled back to its original form. Depending on the exact nature of the scrambling and descrambling process, a single-bit link error may produce a plurality of bit errors in the descrambled frame. These errors will likely be on adjacent bits, or bits close to each other. As a consequence of this resequencing, multiple adjacent or nearby descrambled bit errors will be widely separated after resequencing back. Most of the error bits will be in separate bytes of the frame, the bytes having separate parity bit calculations. Instead of several consecutive link bit errors canceling each other and producing no parity error, the error bits are separated, so that they cause single parity errors in several different bytes after resequencing back.

The present invention has numerous advantages over prior art schemes. First, dual bit interleaving guarantees that a predetermined maximum number of consecutive identical bits will not be exceeded. This may be demonstrated by assuming worst case values for a given serial data frame architecture. An example of this demonstration for a preferred frame architecture will be shown below. Control and parity bit interleaving guarantees frame asymmetry so that the scrambled sequence has 50% balance. Also, parity checks are set up to reduce the likelihood that double bit errors will go undetected by parity tests. This is done by using a resequencing technique which separates bits likely to be affected by a link error far enough apart that separate parity checks will be performed on them, leading to detection of separate parity errors.

DETAILED DESCRIPTION

Before describing in detail the particular improved prescramble encoding and formatting mechanism in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

The present invention will be described in terms of a HIPPI interface device, designed to incorporate the number of data bits, number and definition of control bits, etc., called for in the HIPPI standard. It will be understood, however, that the apparatus and method of the invention are not limited to this standard, but are applicable to other types of systems for transmitting parallel data over serial data links.

Figure 1:
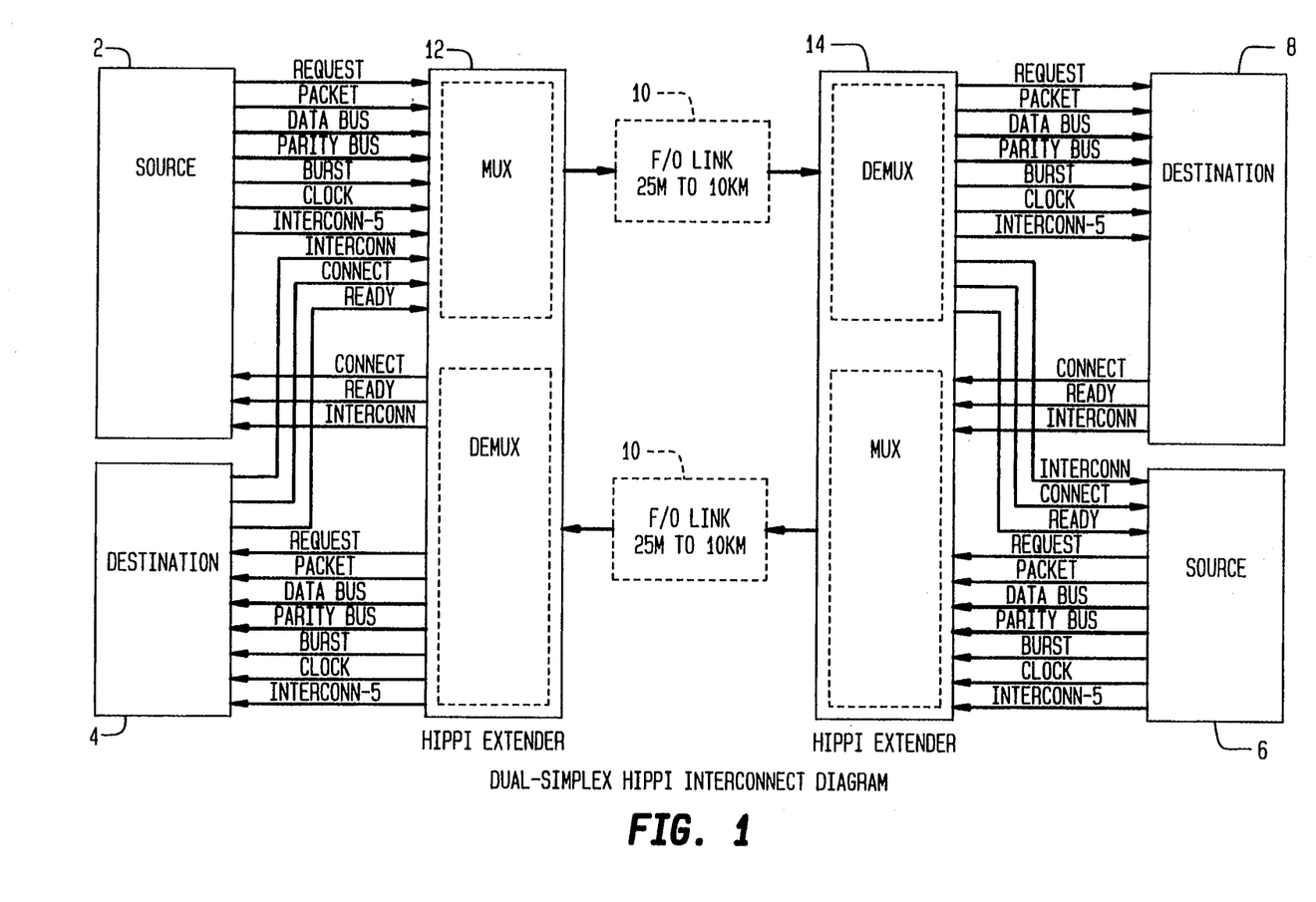
FIG. 1 is a diagrammatic illustration of a dual-simplex HIPPI interconnect arrangement.

FIG. 1 is a system block diagram of a communication system in which first and second HIPPI terminals are interfaced to a bidirectional fiber optic link by means of first and second apparatus according to the invention. The first HIPPI terminal is represented schematically as a source block 2 for providing data to be transmitted over the link and a destination block 4 for receiving data which was received over the link. Similarly, the second HIPPI terminal is shown schematically as a source block 6 and a destination block 8 at the opposite end of the fiber optic link. The link itself is shown schematically as 10. Separate boxes with arrows schematically represent left-to-right and right-to-left links, and are shown along with arrows representing the direction of data flow.

Two multiplexer/demultiplexers (referred to hereafter as muxes) in accordance with the invention are shown at 12 and 14. The muxes 12 and 14 each have a HIPPI interface and a fiber optic interface. Details regarding the implementation of the muxes 12 and 14 will be given below. The fiber optic interfaces each include a transmit interface and a receive interface coupled to appropriate ends of the fiber optic link 10. The HIPPI interfaces are coupled to the respective HIPPI terminals. A detailed pinout for the HIPPI interfaces, including labels and directions for each line, is provided.

Each HIPPI interface includes a transmit data bus and a receive data bus. Each data bus is parallel. While the number of data bits in the busses may vary for other interfaces usable with the invention, in the HIPPI interface shown they are 32-bit busses for carrying four 8-bit bytes of data. A parity bus is shown accompanying each data bus. The number of parity bits may also vary, but in a preferred embodiment for transmitting frames having four 8-bit bytes, the parity busses each include 4 parallel bits. Each parity bit corresponds with eight of the data bits, and is calculated based on the values of those eight bits. Either even or odd parity bits may be included, although it will be shown to be advantageous if both even and odd parity bits are used.

In addition to the data and parity busses, the HIPPI standard calls for several control lines. As shown, the REQUEST, PACKET, BURST, and INTERCONN-S lines go from the respective HIPPI source or to the respective HIPPI destination along with the transmit or receive data. Additional INTERCONN, READY, and CONNECT signals cross over from the HIPPI destination to accompany the transmit data, and vice versa. Each of these signals is single-bit, and has its own parallel line in a HIPPI interface, as shown. The exact definitions of these signals may be found in literature describing the HIPPI standard.

Figure 2:
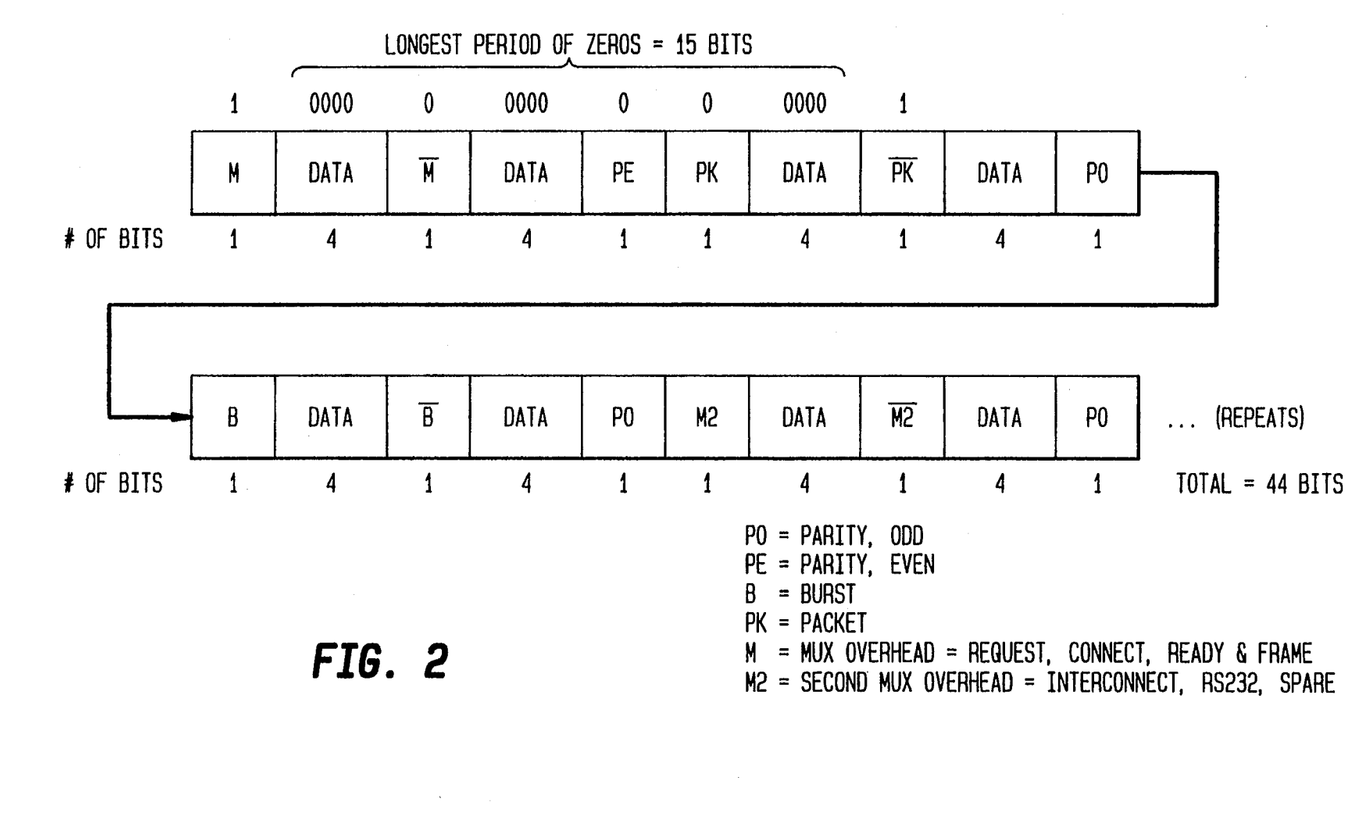
FIG. 2 is a frame format diagram of a sequence of data and overhead bits as they are arranged in sequence for serial transmission, and a legend defining the bits shown in the frame format diagram, according to a preferred embodiment of the invention.

FIG. 2 is a diagram of a preferred frame design for a serial data stream produced by the mux 12 in response to reception of a parallel data word, parity bits, and control bits on the lines of the HIPPI interface shown in FIG. 1. The 32-bit data word is divided into eight sequences of four data bits each. A plurality of bits, referred to generically as interleave bits, are interleaved between the data bit sequences. In a preferred embodiment of the invention, the interleave bits include parity bits and control bits. The interleave bits include several pairs of dual bits, i.e., pairs of active high and active low versions of the same bit.

Four parity bits and PACKET and BURST bits are multiplexed directly into the data, and are thus shown in FIG. 2 as being interleaved with the four-bit sequences. Mux overhead bits M and M2 are also interleaved with the four bit sequences.

The legend at the bottom of FIG. 2 defines each field of the serial data stream. In accordance with the invention, the PACKET and BURST bits are interleaved. Also, various other signals shown in FIG. 1 are sub-multiplexed, and appear as the mux overhead bits M and M2. The legend shows that the INTERCONNECT signals are multiplexed into the M2 bit, and REQUEST, CONNECT, and READY bits are multiplexed into the M bit position. Also multiplexed into the M bit position is a FRAME bit used for PN frame synchronization.

In accordance with the invention, true and inverted versions of each control or multiplexed overhead bit are interleaved in proximity to each other, and at bit intervals relatively prime to the scrambler register lengths. As shown, for instance, the true and inverted M bits are 5 bits apart. This is done, first, to ensure that at least one bit transition shall take place between these bits. Thus, the maximum possible number of consecutive identical bits is related to the spacing of the dual bit. Second, as will be seen in FIGS. 3 and 4, the scrambler and descrambler registers are 7 bits in length. The active high and active low M bit interval is 5 bits, and 5 and 7 are relatively prime. Thus, the frame of FIG. 2 is defined in such a way as to reduce the likelihood of a repeating sequence of bits in the data stream synchronizing with the scrambler, which leads to a repeating scrambled bit pattern with poor DC balance.

Above the top row of bits in the frame diagram is a series of values which illustrate a worst-case sequence of bits having an identical value. If the M bit is 1 (so that the inversion of M is 0) and the PACKET bit PK is 0, their bit values are as shown. The data bits in the first three four-bit data sequences are all assumed to be 0 along with the interleaved bits. Accordingly, there is a 15-bit sequence of consecutive 0s between the high true mux overhead bit, M, and the low-true PACKET bit. It will be seen that the positions of the high true and low true control bits relative to the data bit sequences, along with the predetermined length of the data bit sequences, determine what the maximum number of consecutive identical bits could be. In accordance with the invention, the frame is defined to provide a clearly defined maximum possible number of identical bits.

While various arrangements of the control and parity bits are possible, yielding various maximum possible numbers of consecutive identical bits, the preferred frame architecture shown in FIG. 2 uses the following arrangement. The data words are broken up into four-bit sequences. A control bit immediately precedes each four-bit sequence. High true and low true versions of a given control bit precede consecutive four-bit sequences. After each pair of four-bit sequences preceded by high true and low true versions of the same control bit is a parity bit. Parity bits are calculated for each byte of data.

Various other frame designs or arrangements may be used in accordance with the invention. Data sequences of other lengths may also be used. The exact distribution of control bits may vary. Parity bits need not be used. An inverted version of a selected one of the data bits in an adjacent or nearby data sequence may be used. This inverted version serves equally well to insure that at least one transition occurs between the selected data bit and its inverted version.

Non-limitative examples of interleave bits include parity bits, control bits, multiplexed overhead bits, and inverted data bits. Also, there is a predetermined relationship between each interleave bit and another bit in the frame. In the case of the control bits and the multiplexed overhead bits, the active high and active low bits have the predetermined relationship that they are logical opposites of each other, which are termed dual bits. Further, as shown in the frame structure of FIG. 2, the interleaved bits are separated a predetermined number of frame bits from each other. Also, some of the bits, including data bits, may be inverted to produce dual bits when each frame is assembled. This provides for transitions in idle time intervals, as when all-zero data or some other form of idle data is used to make frames for transmission.

To format a serial frame for scrambling and transmission, the interleaved bits are inserted at predetermined locations, and are resequenced, the data bits are arranged in a resequenced fashion. That is, the bits of the frame are rearranged in serial order, such that bits which were adjacent to each other in the parallel input data are separated. After resequencing, the data frame is scrambled, transmitted over the link, descrambled, and resequenced back to the original bit order. A more detailed discussion of resequencing is given below, since advantages of resequencing for error detection become evident when, after descrambling, the bits are resequenced back to their original order.

Figure 3:
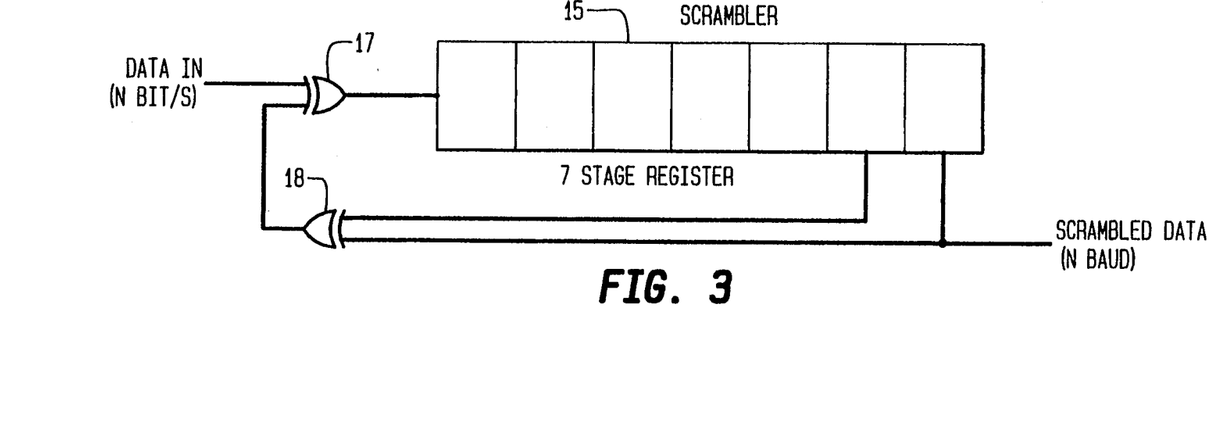
FIG. 3 is a schematic diagram of a data scrambler for use in a preferred embodiment of the invention.
Figure 4:
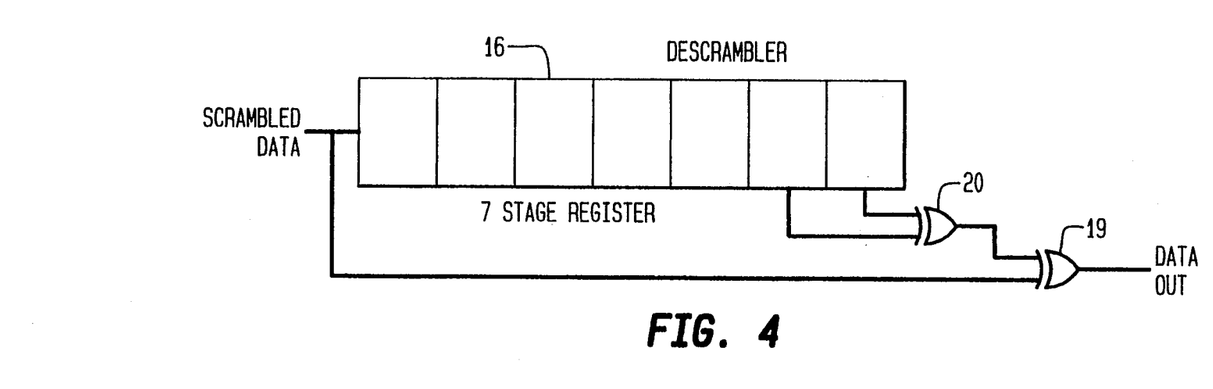
FIG. 4 is a schematic diagram of a data descrambler for use in a preferred embodiment of the invention.

Scrambler and descrambler circuits are respectively shown in FIGS. 3 and 4. After a serial data frame is produced, the bits are scrambled to further provide the required signal characteristics for clock recovery. Scrambling may be accomplished by passing the serial data stream through a linear sequential circuit which sums a pseudorandom bit stream with the serial data stream. Such linear sequential circuits are known in the art, and often take the form of shift registers having taps which are gated together to implement a polynomial. An exemplary scrambling circuit, shown in FIG. 3, includes a shift register 15 which has 7 stages, although any number of stages may be used. A combinational logic circuit, shown as EXCLUSIVE OR gates 17 and 18, has an input coupled to receive input data, and inputs coupled to the 6th and 7th stages of the shift register. An output of the combinational logic circuit provides a data stream to the first stage of the shift register 15. As a result, scrambled data emerges from the last stage of the shift register 15.

It will be noted that an input data sequence can occur which would produce an all 0's state in the scrambler. If that sequence is followed by data 0's, the scrambler output stays at 0 until a 1 data bit occurs to cause the scrambler to transition to other states. The purpose of the dual bits is to provide enough data activity to prevent the scrambler from being stuck in all 1's or 0's. Similarly, a sequence can occur synchronously with the scrambler that causes a limited number of scrambler states to be entered. For example, if the scrambler is 0000001 and the input data repeats as 00000010, the scrambler output would be six 0's and a 1, repeating, which has poor DC balance. By providing asymmetry in the frame, repeating and synchronous input data is avoided and the scrambler states are kept random.

An exemplary descrambling circuit, shown in FIG. 4, includes a shift register 16 which has 7 stages, although again any number of stages may be used. A combinational logic circuit, shown as EXCLUSIVE OR gates 19 and 20, has inputs coupled to the input to the shift register 16, and to the 6th and 7th stages of the shift register 16. Descrambled data thus appears at the output of the combinational logic circuit.

While different length shift registers and different combinational logic circuits may be used, the overall scrambling and descrambling circuits should complement each other, so that the descrambler precisely undoes the scrambling done by the scrambler.

It will be noted that a single error bit produced during transmission causes a number of descrambled error bits related to the number of taps on the descrambler shift register. In the case of the scrambler and descrambler shown in FIGS. 3 and 4, a single link error bit produces three errors in the data output from the descrambler. That is, a single bit error shifted into the shift register 16 influences three descrambled data bits as the error bit appears as the input to the shift register and at the 6th and 7th stages. This production of multiple errors can pose a problem if error detection using parity checks is used. For instance, if there are two bit errors in a sequence of data bits for which a parity bit is calculated, the parity bit will have the same value it would have had if there were no errors. As a result, no parity error would be detected. This is true for any even number of errors.

To reduce the likelihood that parity bits will fail to detect a data error, in accordance with the invention the descrambled bits of a frame are resequenced back to an original sequence so that adjacent erroneous bits caused by a single-bit link error are separated from each other, and distributed over different bit sequences for which different parity bits are calculated. Thus, a single link error which might cause several errors in the descrambled data will cause several different parity errors, increasing the likelihood of error detection.

Figure 5:
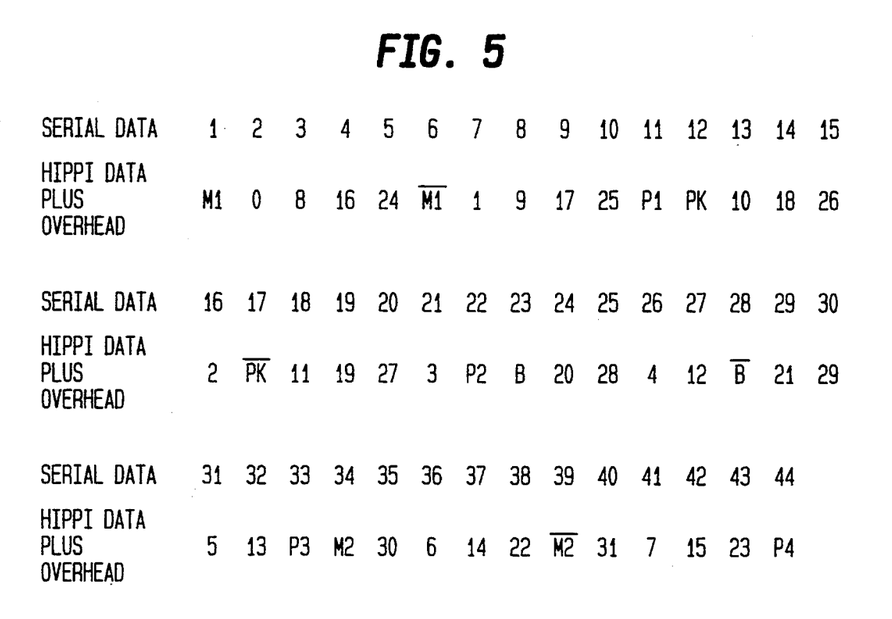
FIG. 5 is a table showing a data frame before and after resequencing in accordance with the invention.

An example of this resequencing is shown in FIG. 5. A descrambled data frame including 44 bits is represented by the numbers 1 through 44, in sequence. Underneath these numbers is an HIPPI data frame which has been resequenced back, including parity and overhead bits. The numbers show the distribution of bits numbered to represent their order before resequencing. For instance, bits 0 through 7, which form a contiguous bit sequence in the descrambled (upper) frame, occupy the 1st, 7th, 16th, 21st, 26th, 31st, 36th, and 41st bit positions, respectively, in the frame which has been resequenced back. Thus, a single-bit link error which, after descrambling, affected several consecutive ones of bits 0 through 7 will likely affect some, if not most, of the data bit sequences after resequencing back. As a consequence, parity bits in the 11th, 22nd, 33rd, and 44th bit positions will likely detect errors, and always detect single bit errors over the link.

Figure 6:
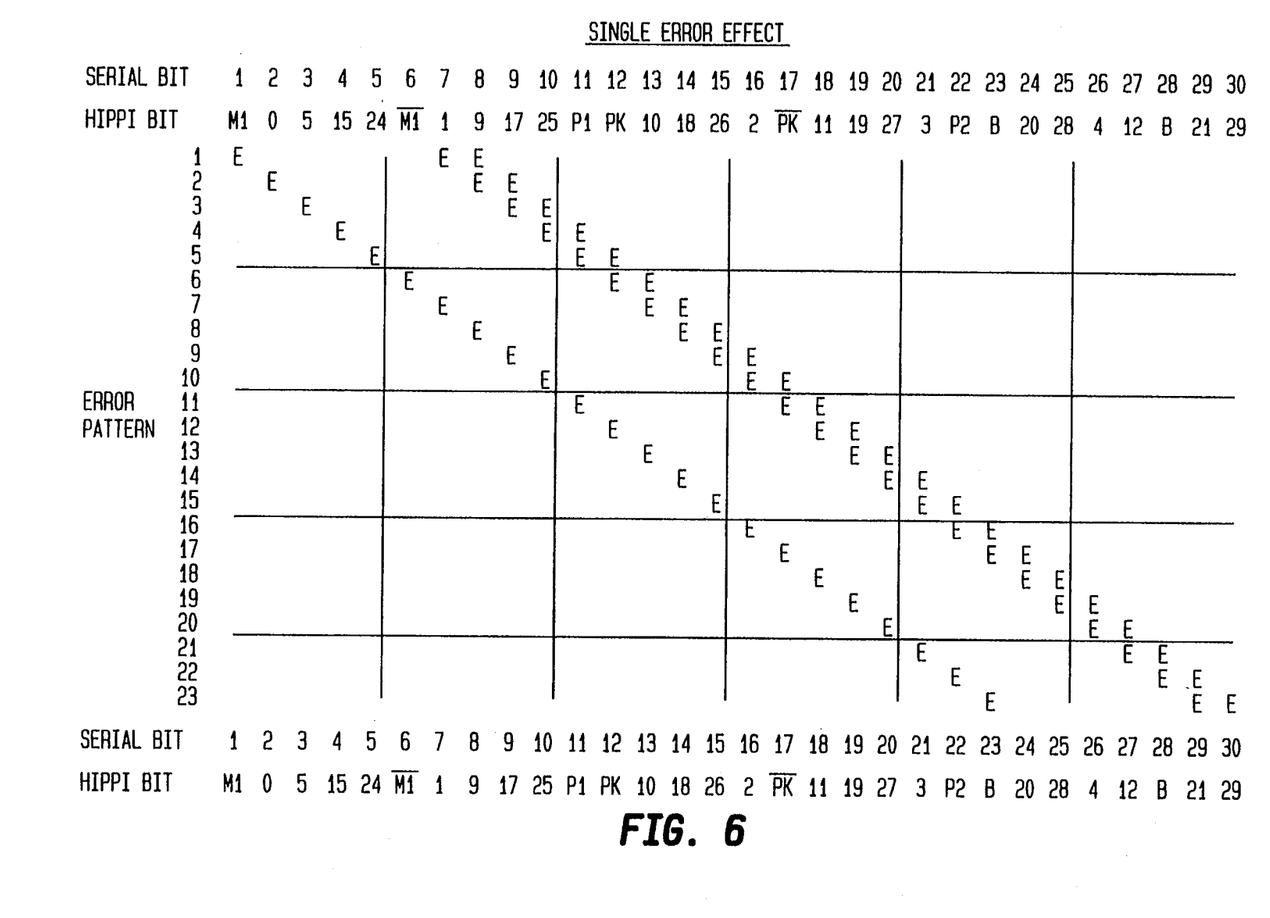
FIGS. 6 and 7 taken together are a chart showing the effect of single bit errors on a data frame descrambled by the apparatus of FIG. 4.
Figure 7:
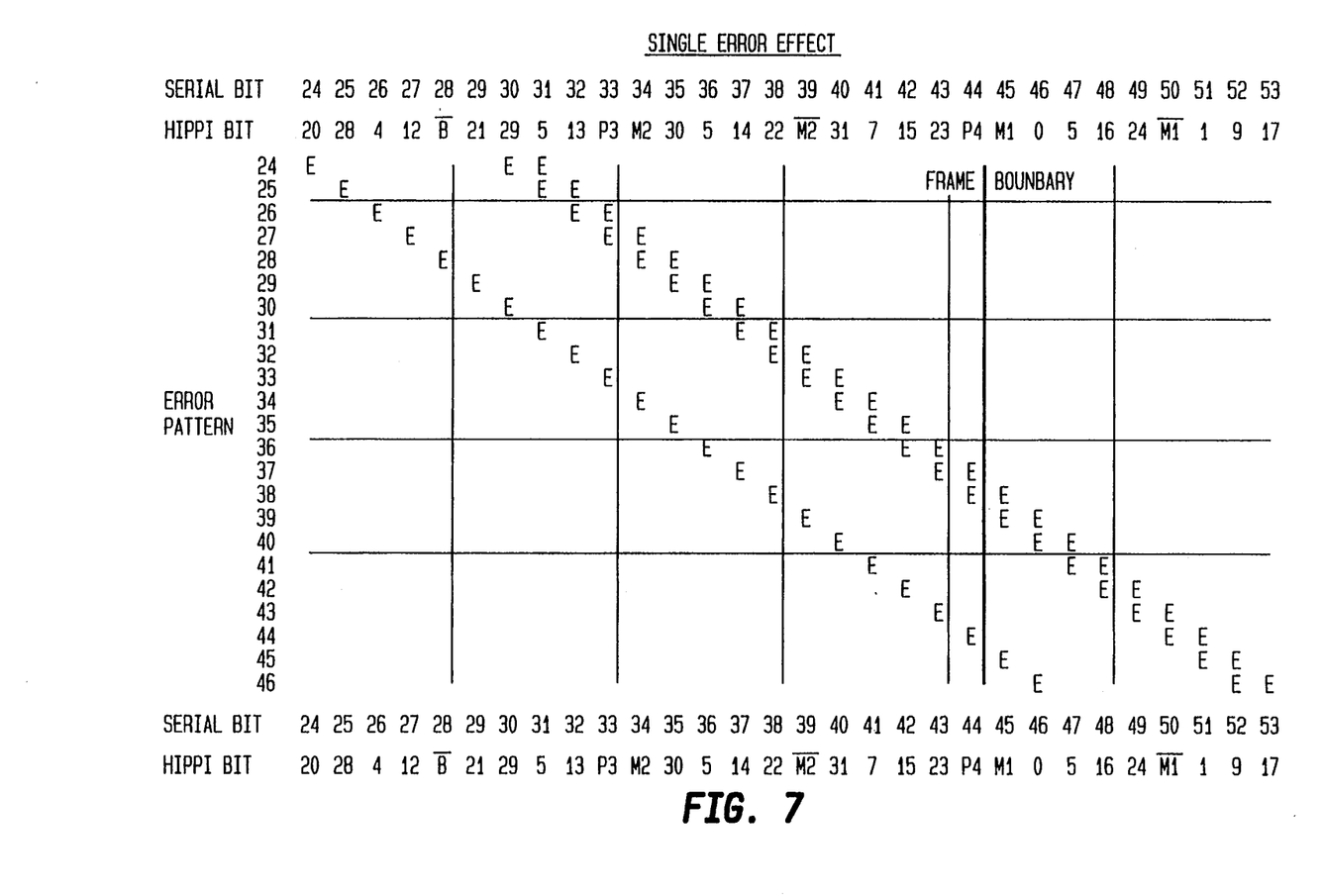

FIGS. 6 and 7 together form a chart which shows the effect of single bit errors for a system employing the scrambler and descrambler of FIGS. 3 and 4. Each row of the chart shows which descrambled bits (the SERIAL BIT line) will be in error due to a given single-bit link error. The charts may be read by finding the appropriate bit number on the "ERROR PATTERN" columns and looking across to see which descrambled bits, identified by number in the "SERIAL BIT" line, are in error. Finally, the bit positions for these error bits after resequencing back may be obtained from the "HIPPI BIT" line. To keep the charts conveniently sized, the SERIAL BIT numbers in FIG. 7 pick up roughly where the numbers in FIG. 6 leave off.

The error bits, symbolized by 'E's, are in rows corresponding to the respective ERROR PATTERN bits. It will be seen that, in accordance with the taps in the descrambler of FIG. 4, a link error produces a single descrambled error bit, five good bits, and two more error bits. As a first example, a single-bit link error on bit 3 corresponds with errors on descrambled serial bits 3, 9, and 10. These bits correspond with the HIPPI bits 17, P1, and OH, after resequencing back. As a second example, a link error at bit 21 corresponds with errors on descrambled bits 21, 27, and 28. These bits correspond with the HIPPI bits 21, 5, and 13 after resequencing back.

Figure 8:
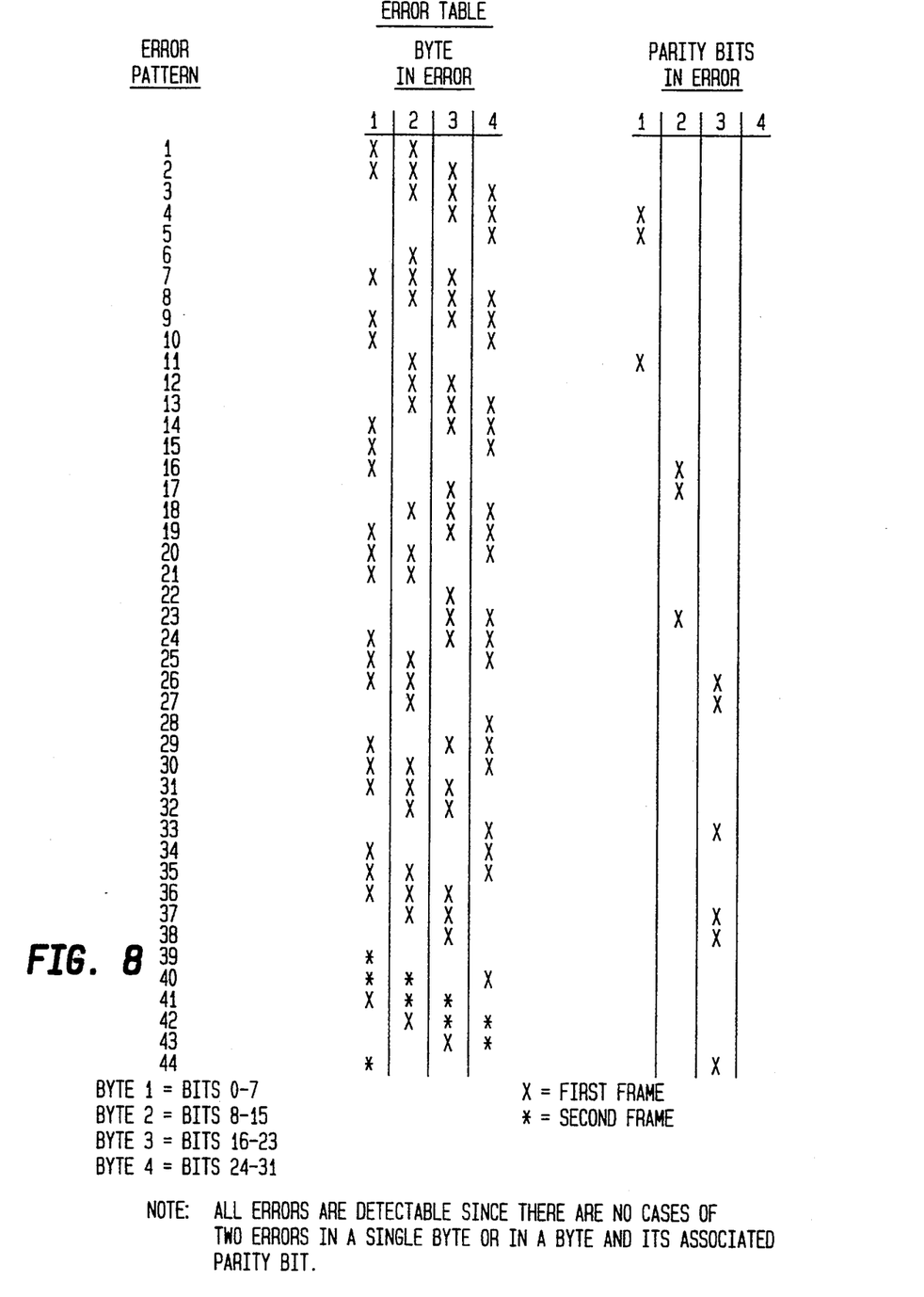
FIG. 8 is a chart identifying, by number, data bytes and parity bits which have errors, after being resequenced back, responsive to the single bit errors of FIGS. 6 and 7.

FIG. 8 is an error table which corresponds with FIGS. 6 and 7. After descrambling and resequencing back, the HIPPI bits are arranged in numerical sequence. For the present example, the bits are grouped into eight-bit bytes, numbered 1 through 4. A parity bit accompanies each byte.

Specifically, a first parity bit accompanies byte 1 (bits 1-8), a second parity bit accompanies byte 2 (bits 9-16), etc.

Given the error bits tabulated in FIGS. 6 and 7, determined above, it may be determined which of the four bytes will contain an error bit, and which of the four parity bits (if any) will be in error. If there is either a single bit error in a byte, or an erroneous parity bit (but not both simultaneously), the parity check will detect an error. These data and parity errors are tabulated for each link error bit.

Figure 9:
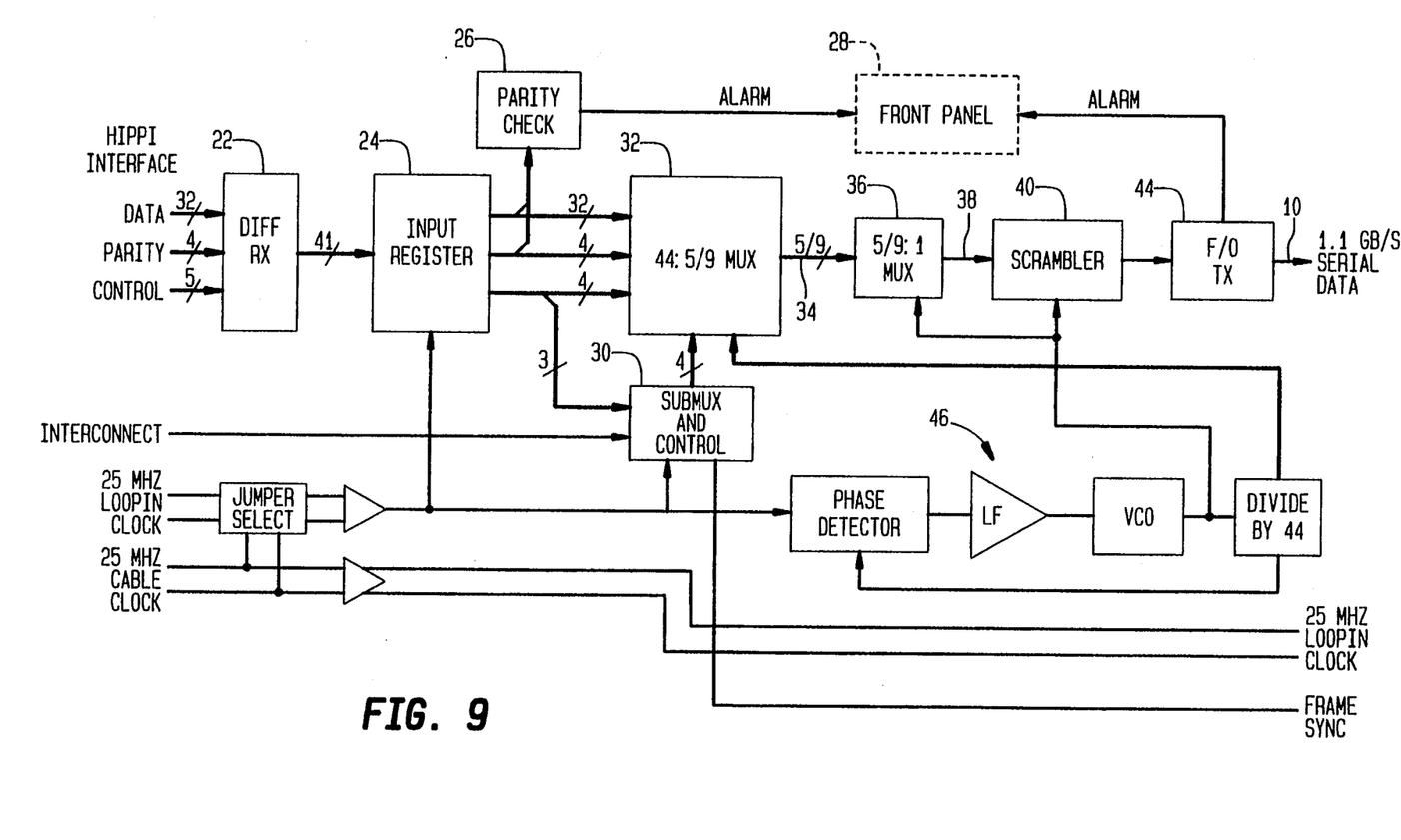
FIG. 9 is a detailed block diagram of an apparatus according to the invention, showing components of the apparatus used for data transmission from a parallel system over a serial fiber optic link.
Figure 10:
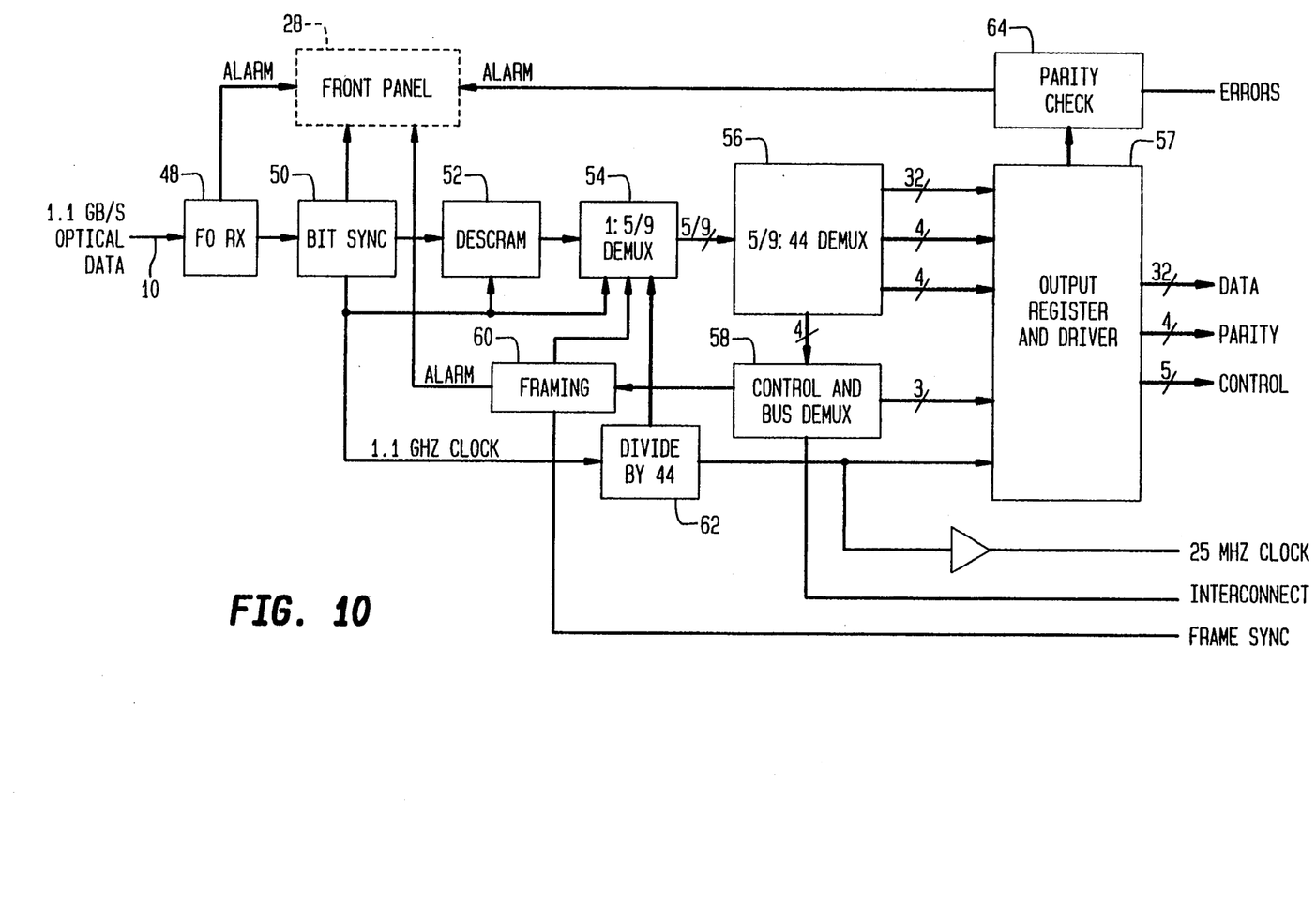
FIG. 10 is a detailed block diagram of an apparatus according to the invention, showing components of the apparatus used for data reception from a fiber optic link.

Turning now to FIGS. 9 and 10, there is shown a detailed block diagram of an apparatus according to the invention. The devices 12 and 14 of FIG. 1 each contain a multiplexer as shown in FIG. 9 and a demultiplexer as shown in FIG. 10. The illustrated apparatus is an interface device for coupling a HIPPI system to a high-speed serial link.

Referring first to the multiplexer of FIG. 9, a 32-bit parallel data word, four parity bits, and five control bits are received from a HIPPI interface. A HIPPI differential receiver 22, designed for compatibility with the hardware HIPPI specification, receives these data bits, and stores them in a register 24. A parity checker 26 is coupled to receive and test the data word and parity bits, and display any errors on a front panel 28.

As described above in connection with the frame definition of FIG. 2, certain ones of the control bits, in this case the CONNECT, READY, and REQUEST control bits, are diverted to a sub-multiplexer 30, which is also coupled to receive a PN FRAME SYNC bit and an INTERCONNECT bit. The sub-mux 30 produces the multiplexed M and M2 control bits as shown in FIG. 2. A main multiplexer 32 is coupled to receive the M and M2 bits, and also the data word, the parity bits, and the PACKET and BURST bits from the register 24. The main mux 32 divides the data word into a plurality of data bit sequences and interleaves the parity and control bits to produce a serial frame as shown in FIG. 2. The frame is sent in several parallel sections over a bus 34 to a secondary mux 36, which has a serial output 38 providing the frame in serial form. Rearranging the order of the bits of a frame formatted as shown in FIG. 2 is very simply accomplished by selectively connecting the bus links between input register 24 to the inputs of multiplexer 32 in accordance with a prescribed resequencing bit position scheme.

A scrambler 40, as shown in FIG. 4.produces scrambled data, which is sent over a 1.1 Gbits/sec fiber optic line 10, as shown in FIG. 1, by an optical transmitter 44. An injection laser fiber optic transmitter is used in a preferred embodiment, although other suitable high speed light sources may be used. In separate circuitry, an input 25 MHz system clock is multiplied by a multiplying phase locked loop shown as 46 to produce a 1.1 GHz link clock. Clock loop-through and frame lock signals are provided to support a 64 bit, 4 fiber implementation.

Turning now to FIG. 10, a demultiplexer is shown. Placing FIGS. 9 and 10 side by side shows the overall system with fiber optic link 10 which exits FIG. 9 on the right entering FIG. 10 on the left.

A wideband fiber optic receiver 48 receives the optical signal from the link 10 and converts the optical signal to an electrical serial data signal. A bit synchronizer 50 extracts a 1.1 GHz clock from the data and retimes the data with the recovered clock. A descrambler 52, shown in FIG. 4, descrambles the serial data signal. A main demultiplexer 56 provides the frame bits, resequenced back, in several groups at its output. Recovering, or resequencing back, from the resequencing imparted by the transmitter of FIG. 9 is readily accomplished by selectively connecting the bus links at the output of a demultiplexer 56 to the inputs of output register 57 in accordance with the complement of the resequencing bit position scheme used for interconnecting the bus links between input register 24 and multiplexer 32.

Demultiplexer 56 converts the serial frame back to its original form. Demultiplexer 56 receives the groups of bits from the secondary multiplexer 54, and provides data bits, 4 parity bits, and the PACKET and BURST control bits. These bits are provided to an output register and driver 57. The multiplexed control bits (M and M2) are separately routed to a sub-demux 58 which demultiplexes the control bits back to separate signals. CONNECT, READY, and REQUEST are provided to the register 57. INTERCONNECT is provided as a separate output, and the frame sync bit is provided to a framing checker 60. The checker 60 provides a FRAME SYNC output and a frame error signal to the front panel 28.

The 1.1 GHz clock from the synchronizer 50 is divided by 44 by a clock divider 62 to produce a 25 MHz clock, which is used by the output register 57. A parity checker 64 checks for parity errors in the data stored in the register 57, and sends an error signal to the front panel 28 if a parity error is detected. As discussed above, errors as tabulated in FIGS. 6 and 7 produce data and parity bit errors as tabulated in FIG. 8. These errors cause the test run by the parity checker 64 to fail. Thus, the front panel 28 indicates one or more parity errors responsive to a link error.

As will be appreciated from the foregoing description, the encoding and formatting mechanism in accordance with the present invention ensures that data communications carried by a network such as one including a fiber optic communication interface have adequate signal balance and frequent transitions notwithstanding the contents of the data stream. The formatting mechanism of the present invention is relatively simple and avoids data stream delay by the use of true and inverted versions of predefined bits, termed "dual bits" that are inserted into the data stream. Advantageously overhead bits are employed in a manner that makes data frames of the data stream asymmetric and non-periodic. In addition resequencing the data enhances error detection when parity checking is used.

While I have shown and described an embodiment in accordance with the present invention, it is to be understood that the invention is not limited thereto, but is susceptible to numerous changes and modifications as known to a person skilled in the art. I therefore do not wish to be limited to the details shown and described herein, but rather intend to cover all such changes and modifications as are obvious to one of ordinary skill in the art.

What is claimed:

1. A method of formatting digital data for serial transmission comprising the steps of:
   (a) providing digital data to be transmitted as sequential pluralities of data bits;
   (b) interleaving, between successive ones of said pluralities of data bits, at least one additional bit so as to produce an interleaved data bit sequence, and wherein selected ones of said pluralities of data bits are immediately preceded and succeeded by complementary values of the same additional interleaved bit; and
   (c) scrambling the entirety of the interleaved data bit sequence produced in step (b).

2. A method according to claim 1, wherein step (b) further comprises rearranging the order of the bits of said interleaved data bit sequence to produce a resequenced bit stream, and step (c) comprises scrambling the entirety of the resulting rearranged order of the interleaved data bit sequence produced by step (b).

3. A method according to claim 1, wherein step (c) comprises generating a scrambled bit on the basis of plural consecutive bits of said interleaved data bit sequence, and wherein the bit spacing between interleaved bits is relatively prime with respect to the number of said plural consecutive bits of said interleaved data bit sequence.

4. A method according to claim 1, wherein step (b) further comprises inserting a parity bit as an additional bit between selected successive ones of said pluralities of data bits, said parity bit being defined in accordance with the contents of a set of preceding ones of said pluralities of data bits.

5. A method according to claim 4, wherein step (b) comprises predefining whether the inserted parity bit represents odd or even parity so as to produce odd and even parity bit asymmetry throughout the formatted data bit stream.

6. A method of formatting a multibyte digital word for serial transmission comprising the steps of:
   (a) subdividing successive bytes of said multibyte digital word into a sequence of sub-bytes; and
   (b) for each byte of said multi-byte digital word, interleaving one of its sub-bytes between an additional bit and the complement of said additional bit, and appending a parity bit to the other of its sub-bytes, so as to obtain an interleaved digital bit sequence; and
   (c) scrambling the entirety of the interleaved digital bit sequence obtained in step (b).

7. A method according to claim 6, wherein step (b) further comprises rearranging the order of the bits of the interleaved digital bits sequence to produce a resequenced bit stream, and wherein step (c) comprises scrambling the entirety of the resequenced bit stream produced in step (b).

8. A method according to claim 6, wherein, in step (b), said parity bit is defined in accordance with the contents of said each byte.

9. A method according to claim 6, wherein, in step (b), said parity bit is defined in accordance with the contents of a set of preceding ones of data sub-bytes.

10. A method according to claim 9, wherein step (b) further comprises predefining whether the interleaved parity bit represents odd or even parity so as to produce odd and even parity bit asymmetry throughout the formatted digital word.

11. A method of transmitting and recovering serial digital data comprising the steps of:
   at a transmitter site,
      (a) providing digital data to be transmitted as sequential pluralities of data bits,
      (b) interleaving, between successive ones of said pluralities of data bits, at least one additional bit so as to produce an interleaved data bit sequence, and wherein selected ones of said pluralities of data bits are immediately preceded and succeeded by complementary values of the same additional interleaved bit, and
      (c) scrambling the entirety of the interleaved bit sequence produced in step (b), and transmitting the resulting scrambled interleaved bit sequence to a receiver site; and
   at said receive site,
      (d) receiving and descrambling the received scrambled interleaved data bit sequence, and
      (e) extracting the interleaved bits from the interleaved data bit sequence so as to derive said sequential pluralities of data bits.

12. A method according to claim 11, wherein step (b) further comprises rearranging the order of the bits comprising said interleaved data bit sequence prior to scrambling, and wherein step (e) comprises resequencing back the order of the descrambled interleaved data bit sequence in the course of extracting the interleaved bits from the interleaved data bits sequence to derive said sequential pluralities of data bits.

13. A method according to claim 11, wherein step (b) further comprises inserting a parity bit as an additional bit between selected successive ones of said pluralities of data bits, said parity bit being defined in accordance with the contents of a set of preceding ones of said pluralities of data bits.

14. A method according to claim 13, wherein step (b) comprises predefining whether the inserted parity bit represents odd or even parity so as to produce odd and even parity bit asymmetry throughout the formatted data bit stream.

15. An apparatus for formatting digital data for serial transmission comprising:
   a bit interleaver coupled to receive sequential pluralities of data bits and additional bits, said bit interleaver being operative to interleave, between successive ones of said pluralities of data bits, at least one additional bit so as to produce an interleaved data bit sequence, such that selected ones of said pluralities of data bits are immediately preceded and succeeded by complementary values of the same additional interleaved bit; and
   a scrambler coupled to scramble the entirety of the interleaved data bit sequence produced by said bit interleaver.

16. An apparatus according to claim 15, wherein said bit interleaver is operative to rearrange the order of the bits of said interleaved data sequence to produce a resequenced bit stream for application to said scrambler.

17. An apparatus according to claim 15, wherein said scrambler is operative to generated a scrambled bit on the basis of plural consecutive bits of said interleaved data sequence, and wherein the bit spacing between interleaved bits is relatively prime with respect to the number of said plural consecutive bits of said interleaved data sequence.

18. An apparatus according to claim 15, wherein said bit interleaver is operative to insert a parity bit as an additional bit between selected successive ones of said pluralities of data bits, said parity bit being defined in accordance with the contents of a set of preceding ones of said pluralities of data bits.

19. An apparatus according to claim 16, wherein whether a parity bit inserted by said bit interleaver is predefined to represent odd or even parity so as to produce odd and even parity bit asymmetry throughout the interleaved data bit sequence applied to said scrambler.

20. A system for of transmitting and recovering serial digital data comprising:
   at a transmitter site,
      a bit interleaver coupled to receive sequential pluralities of data bits and additional bits, said bit interleaver being operative to interleave, between successive ones of said pluralities of data bits, at least one additional bit so as to produce an interleaved data bit sequence, such that selected ones of said pluralities of data bits are immediately preceded and succeeded by complementary values of the same additional interleaved bit,
      a scrambler coupled to scramble the entirety of the interleaved data bit sequence produced by said bit interleaver, and
      a transmitter operative to transmit the resulting scrambled interleaved bit sequence to a receiver site; and
   at said receive site,
      a receiver operative to receive the scrambled interleaved bit sequence,
      a descrambler operative to descramble the received scrambled interleaved data bit sequence, and
      a demultiplexing unit, coupled to said descrambler and operative to extract interleaved bits from said interleaved data bit sequence so as to derive said sequential pluralities of data bits.

21. A system according to claim 20, wherein said bit interleaver is operative to rearrange the order of the bits of said interleaved data sequence to produce a resequenced bit stream for application to said scrambler, and wherein said demultiplexing unit is operative to resequence back the order of the descrambled interleaved data bit sequence in the course of extracting the interleaved bits from the interleaved data bits sequence to derive said sequential pluralities of data bits.

22. A system according to claim 21, wherein said scrambler is operative to generated a scrambled bit on the basis of plural consecutive bits of said interleaved data sequence, and wherein the bit spacing between interleaved bits is relatively prime with respect to the number of said plural consecutive bits of said interleaved data sequence.

23. A system according to claim 20, wherein said bit interleaver is operative to insert a parity bit as an additional bit between selected successive ones of said pluralities of data bits, said parity bit being defined in accordance with the contents of a set of preceding ones of said pluralities of data bits.

24. A method of encoding digital data for serial transmission over a digital communications link comprising the steps of:

(a) interleaving parity and complementary overhead bits with respective sequences of digital data bits to form a composite digital bit stream; and (b) scrambling the entirety of said composite digital bit stream to form an encoded digital bit stream.

25. A method according to claim 24, wherein step (a) further comprises rearranging the bits of said composite bit stream to form a rearranged composite bit stream, and step (b) comprises scrambling the entirety of said rearranged composite digital bit stream to form said encoded digital bit stream.

26. A method according to claim 25, wherein step (a) further comprises interleaving said parity bits with said respective sequences of digital data bits in such a manner that descrambling of said encoded digital bit stream after its transmission over said digital communications link and rearranging of the descrambled digital bits stream produces a prescribed multibit error pattern for every single bit error that has been introduced into the digital bit stream.

27. A digital data communication system for conducting serial data communications over a digital communications link comprising:
   at a transmitter site,
      an encoder unit which is operative to interleave parity and complementary overhead bits with respective sequences of digital data bits to form a composite digital bit stream,
      a scrambler which is coupled to said encoder unit and is operative to scramble the entirety of said composite digital bit stream into an encoded digital bit stream, and
      a transmitter unit which is coupled to said scrambler and is operative to transmit said encoded digital bit stream in serial format over said digital communications link; and
   at a receiver site,
      a receiver unit which is operative to receive said encoded digital bit stream that has been transmitted in serial format over said digital communications link,
      a descrambler which is coupled to said receiver and is operative to descramble said encoded digital bit stream into a descrambled composite digital bit stream, and
      a decoder unit which is operative to extract, from said descrambled composite digital bit stream, parity bits, complementary overhead bits, and respective sequences of digital data bits.

28. A digital data communication system according to claim 27, wherein, at said transmitter site, said encoder unit is further operative to rearrange the order of bits of said composite digital bit stream into a rearranged composite digital bit stream, and said scrambler is operative to scramble said rearranged composite digital bit stream into said encoded digital bit stream, and, at said receiver site, said decoder unit is operative to rearrange bits of said descrambled composite digital bit stream into the order of bits of the composite bits stream formed by said encoder.

29. A digital data communication system according to claim 28, wherein said encoder unit is further operative to interleave said parity bits with said respective sequences of digital data bits in such a manner that rearranging of bits of said descrambled composite digital bit stream by said decoder unit produces a prescribed multibit error pattern for every single bit error that has been introduced into the received digital bit stream.

* * * * *